(12) United States Patent
Endo

(10) Patent No.: US 11,215,708 B2
(45) Date of Patent: Jan. 4, 2022

(54) FLIGHT FEEDBACK CONTROL BASED ON GUST DETECTION AROUND HAPS

(71) Applicant: HAPSMobile Inc., Tokyo (JP)

(72) Inventor: Yoshihiro Endo, Tokyo (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/253,235

(22) PCT Filed: May 29, 2019

(86) PCT No.: PCT/JP2019/021360
§ 371 (c)(1),
(2) Date: Dec. 17, 2020

(87) PCT Pub. No.: WO2019/244591
PCT Pub. Date: Dec. 26, 2019

(65) Prior Publication Data
US 2021/0255316 A1    Aug. 19, 2021

(30) Foreign Application Priority Data

Jun. 19, 2018 (JP) .............................. JP2018-116408

(51) Int. Cl.
*G01S 13/95* (2006.01)
*G05D 1/10* (2006.01)
(Continued)

(52) U.S. Cl.
CPC .......... *G01S 13/953* (2013.01); *G01S 13/951* (2013.01); *G01S 13/956* (2013.01);
(Continued)

(58) Field of Classification Search
CPC ........ B64C 2201/122; B64C 2201/021; B64C 2201/022; B64C 2201/042;
(Continued)

(56) References Cited

U.S. PATENT DOCUMENTS 5,136,296 A * 8/1992 Roettger ............... G01S 13/951
342/26 D
5,797,105 A * 8/1998 Nakaya ................... G01P 5/165
244/177
(Continued)

FOREIGN PATENT DOCUMENTS

JP    2000-168693 A    6/2000
JP    2004-500786 A    1/2004
(Continued)

OTHER PUBLICATIONS

Lte, ARIB, "Evolved Universal Terrestrial Radio Access (E-UTRA) and Evolved Universal Terrestrial Radio Access Network (E-UTRAN)", 3GPP TS 36.300, ARIB STD-T104-36.300, V10.12.0, Overall description, Stage 2, Release 10, Dec. 2014.
(Continued)

*Primary Examiner* — Kevin P Mahne
(74) *Attorney, Agent, or Firm* — Muirhead and Saturnelli, LLC

(57) ABSTRACT

It is prevented that a communication relay apparatus in an upper airspace, which is suitable for constructing a three-dimensional network, falls by a strong wind. A communication relay apparatus is provided with a relay communication station that performs a radio communication with a terminal apparatus, and is capable of flying in an upper airspace by an autonomous control or an external control. This communication relay apparatus includes a flight control section that controls a flight of the communication relay apparatus based on flight control information determined so as to reduce an influence of a strong wind generated around the communication relay apparatus. The flight control information may include information for controlling at least one of a flight direction, velocity, altitude, attitude, flight route and flight pattern of the communication relay apparatus.

21 Claims, 13 Drawing Sheets

(51) Int. Cl.

| | | |
|---|---|---|
| *G05D 1/00* | (2006.01) | |
| *G08G 5/00* | (2006.01) | |
| *G05D 1/04* | (2006.01) | |
| *H04B 7/185* | (2006.01) | |
| *H04W 84/06* | (2009.01) | |
| *H04W 84/00* | (2009.01) | |

(52) U.S. Cl.
CPC ........... *G05D 1/0088* (2013.01); *G05D 1/042* (2013.01); *G05D 1/046* (2013.01); *G05D 1/101* (2013.01); *G08G 5/003* (2013.01); *H04B 7/18504* (2013.01); *H04W 84/06* (2013.01); *B64C 2201/122* (2013.01); *G05D 1/1062* (2019.05); *H04W 84/005* (2013.01)

(58) Field of Classification Search
CPC ........ B64C 2201/141; B64C 2201/146; B64C 39/024; G01S 13/953; G01S 13/951; G01S 13/956; G05D 1/0088; G05D 1/042; G05D 1/046; G05D 1/101; G05D 1/1062; G05D 1/0204; G05D 1/106; G08G 5/003; H04B 7/18504; H04W 84/06; H04W 84/005; B64D 31/06
See application file for complete search history.

(56) References Cited

U.S. PATENT DOCUMENTS

| | | | |
|---|---|---|---|
| 8,788,122 B1 | 7/2014 | Sankrithi et al. | |
| 9,208,688 B2 | 12/2015 | Spinelli et al. | |
| 9,665,103 B1* | 5/2017 | Bonawitz | ................. G01P 5/00 |
| 2003/0150961 A1* | 8/2003 | Boelitz | ................. B64G 1/002 |
| | | | 244/158.1 |
| 2004/0092258 A1* | 5/2004 | Hibbs | ................. H04B 7/18504 |
| | | | 455/431 |
| 2005/0035242 A1 | 2/2005 | Nugent et al. | |
| 2007/0252035 A1 | 11/2007 | Hubbard | |
| 2013/0037650 A1* | 2/2013 | Heppe | ................. B64B 1/54 |
| | | | 244/2 |
| 2017/0321658 A1* | 11/2017 | An | ................. F03D 9/32 |
| 2018/0157261 A1* | 6/2018 | Kuhlmann | ................. B64D 31/06 |
| 2019/0033862 A1* | 1/2019 | Groden | ................. G05D 1/0072 |
| 2019/0033884 A1* | 1/2019 | Candido | ................. G08G 5/0091 |
| 2019/0064338 A1* | 2/2019 | Holt | ................. G01S 13/426 |
| 2020/0241571 A1* | 7/2020 | Torii | ................. G01S 19/14 |
| 2020/0380874 A1* | 12/2020 | Fujii | ................. H04W 4/40 |

FOREIGN PATENT DOCUMENTS

| | | |
|---|---|---|
| JP | 2005-082018 A | 3/2005 |
| JP | 2006-176073 A1 | 7/2006 |
| JP | 2007-290647 A | 11/2007 |
| JP | 2015-512818 A | 4/2015 |
| JP | 2017-519297 A | 7/2017 |
| JP | 2018-034691 A | 3/2018 |
| JP | 2019-077694 A1 | 5/2019 |

OTHER PUBLICATIONS

Lte, "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN)," 3GPP TS 36.300, V13.5.0, Overall description, State 2, Release 13, Sep. 2016.
Giovanni Romano, "3GPP RAN progress on 5G," TIM, 2016.
Reiko Müller, et al., "Multiphysical Simulation of a Semi-Autonomous Solar Powered High Altitude Pseudo-Satellite," 978-1-5386-2014-4/18, 2018, IEEE.

* cited by examiner

FLIGHT FEEDBACK CONTROL BASED ON GUST DETECTION AROUND HAPS

TECHNICAL FIELD

The present invention relates to a flight control of HAPS suitable for constructing a three-dimensional network.

BACKGROUND ART

There is conventionally known a communication standard called LTE-Advanced Pro (see Non-Patent Literature 2), which is an extension of LTE (Long Term Evolution)-Advanced (see Non-Patent Literature 1) of 3GPP, which is a communication standard for mobile communication systems. In this LTE-Advanced Pro, specifications have been established for providing communications to recent devices for IoT (Internet of Things). Furthermore, the fifth generation mobile communication that supports simultaneous connections to a large number of terminal apparatuses (also referred to as "UE (user equipment)", "mobile station", and "communication terminal") such as devices for IoT and low delay is under study (for example, see Non-Patent Literature 3).

CITATION LIST

Non-Patent Literature

Non-Patent Literature 1: 3GPP TS 36.300 V10.12.0 (2014-12).
Non-Patent Literature 2: 3GPP TS 36.300 V13.5.0 (20164-09).
Non-Patent Literature 3: G. Romano, "3GPP RAN progress on "5G"", 3GPP, 2016.

SUMMARY OF INVENTION

Technical Problem

In case of disposing a radio relay apparatus capable of flying in an upper airspace so as to realize a three-dimensional network in a next-generation mobile communication such as the foregoing fifth generation, there is a fear that the radio relay apparatus in flight falls due to unstable attitude of the aircraft by receiving a sudden strong wind (hereinafter referred to as "gust") caused by a rapid upward airflow or downward airflow (downburst), etc. generated in the upper airspace.

Solution to Problem

A communication relay apparatus according to an aspect of the present invention is a communication relay apparatus capable of flying in an upper airspace by an autonomous control or an external control, which is provided with a relay communication station for performing a radio communication with a terminal apparatus. The communication relay apparatus comprises a flight control means for controlling a flight of the communication relay apparatus based on flight control information determined so as to reduce an influence of a strong wind generated around the communication relay apparatus.

In the foregoing communication relay apparatus, the flight control information may include at least one of a flight direction, velocity, altitude, attitude, flight route and flight pattern of the communication relay apparatus.

In the foregoing communication relay apparatus, the communication relay apparatus may comprise a Doppler radar for detecting a strong wind generated around the communication relay apparatus by observing a direction and velocity of a wind around the communication relay apparatus, and means for determining flight control information of the communication relay apparatus so as to reduce an influence of the strong wind detected by the Doppler radar may be provided.

In the foregoing communication relay apparatus, the communication relay apparatus may comprise means for receiving information on a strong wind generated around the communication relay apparatus detected by a Doppler radar disposed outside, and means for determining flight control information of the communication relay apparatus so as to reduce an influence of the strong wind generated around the communication relay apparatus may be provided.

In the foregoing communication relay apparatus, the communication relay apparatus may comprise means for receiving flight control information of the communication relay apparatus, which is determined so as to reduce an influence of a strong wind generated around the communication relay apparatus detected by a Doppler radar disposed outside.

The foregoing Doppler radar may be disposed in a feeder station on the ground or on the sea that relays a communication between the communication relay apparatus and a mobile communication network.

In the foregoing communication relay apparatus, a detection target airspace for detecting the strong wind with the Doppler radar may be narrowed down based on information on a current position and a flight route of the communication relay apparatus.

In the foregoing communication relay apparatus, a detection target airspace for detecting the strong wind with the Doppler radar may be narrowed down based on at least one of a statistical value of a past upper-air weather observation data, a latest upper-air weather observation data and a weather measurement data measured by a measurement apparatus provided in the communication relay apparatus.

In the foregoing communication relay apparatus, a three-dimensional cell may be formed in a predetermined cell-formation target airspace between the ground or the sea surface, and an altitude of the cell-formation target airspace may be 10 [km] or less.

The foregoing communication relay apparatus may be located at an altitude of 100 [km] or less.

A system according to another aspect of the present invention comprises any of the foregoing communication relay apparatuses, a Doppler radar disposed on the ground or on the sea to detect a strong wind generated around the communication relay apparatus by observing a direction and velocity of a wind around the communication relay apparatus, and a management apparatus for managing the communication relay apparatus. And the management apparatus determines flight control information of the communication relay apparatus so as to reduce an influence of the strong wind generated around the communication relay apparatus, based on information on the strong wind generated around the communication relay apparatus detected by the Doppler radar and a current position of the communication relay apparatus, and transmits the flight control information to the communication relay apparatus.

A management apparatus according to still another aspect of the present invention is a management apparatus located on the ground, on the sea or in an upper airspace. The management apparatus manages any of the foregoing communication relay apparatuses, and comprises means for determining flight control information of the communication relay apparatus so as to reduce an influence of the strong wind generated around the communication relay apparatus, based on information on the strong wind generated around the communication relay apparatus detected by a Doppler radar and a current position of the communication relay apparatus, and means for transmitting the flight control information to the communication relay apparatus.

A method according to still another aspect of the present invention is a method for controlling a flight of a communication relay apparatus capable of flying in an upper airspace by an autonomous control or an external control. The communication relay apparatus comprises a relay communication station for performing a radio communication with a terminal apparatus. The method comprises determining flight control information of the communication relay apparatus so as to reduce an influence of a strong wind generated around the communication relay apparatus, and controlling a flight of the communication relay apparatus based on the flight control information.

A program according to still another aspect of the present invention is a program for making a computer or a processor control a flight of a communication relay apparatus capable of flying in an upper airspace by an autonomous control or an external control. The communication relay apparatus comprises a relay communication station for performing a radio communication with a terminal apparatus. The program comprises a program code for determining flight control information of the communication relay apparatus so as to reduce an influence of a strong wind generated around the communication relay apparatus, and a program code for controlling a flight of the communication relay apparatus based on the flight control information.

A recording medium according to still another aspect of the present invention is a recording medium in which a program readable by a computer or a processor is recorded. The program is a program for making a computer or a processor control a flight of a communication relay apparatus capable of flying in an upper airspace by an autonomous control or an external control. The communication relay apparatus comprises a relay communication station for performing a radio communication with a terminal apparatus. The program comprises a program code for determining flight control information of the communication relay apparatus so as to reduce an influence of a strong wind generated around the communication relay apparatus, and a program code for controlling a flight of the communication relay apparatus based on the flight control information.

Advantageous Effects of Invention

According to the present invention, it is capable of preventing that a fall of a communication relay apparatus in an upper airspace, which is suitable for constructing a three-dimensional network, falls by a strong wind such as a gust.

DESCRIPTION OF EMBODIMENTS

Hereinafter, embodiments of the present invention will be described with reference to the drawings.

Figure 1:
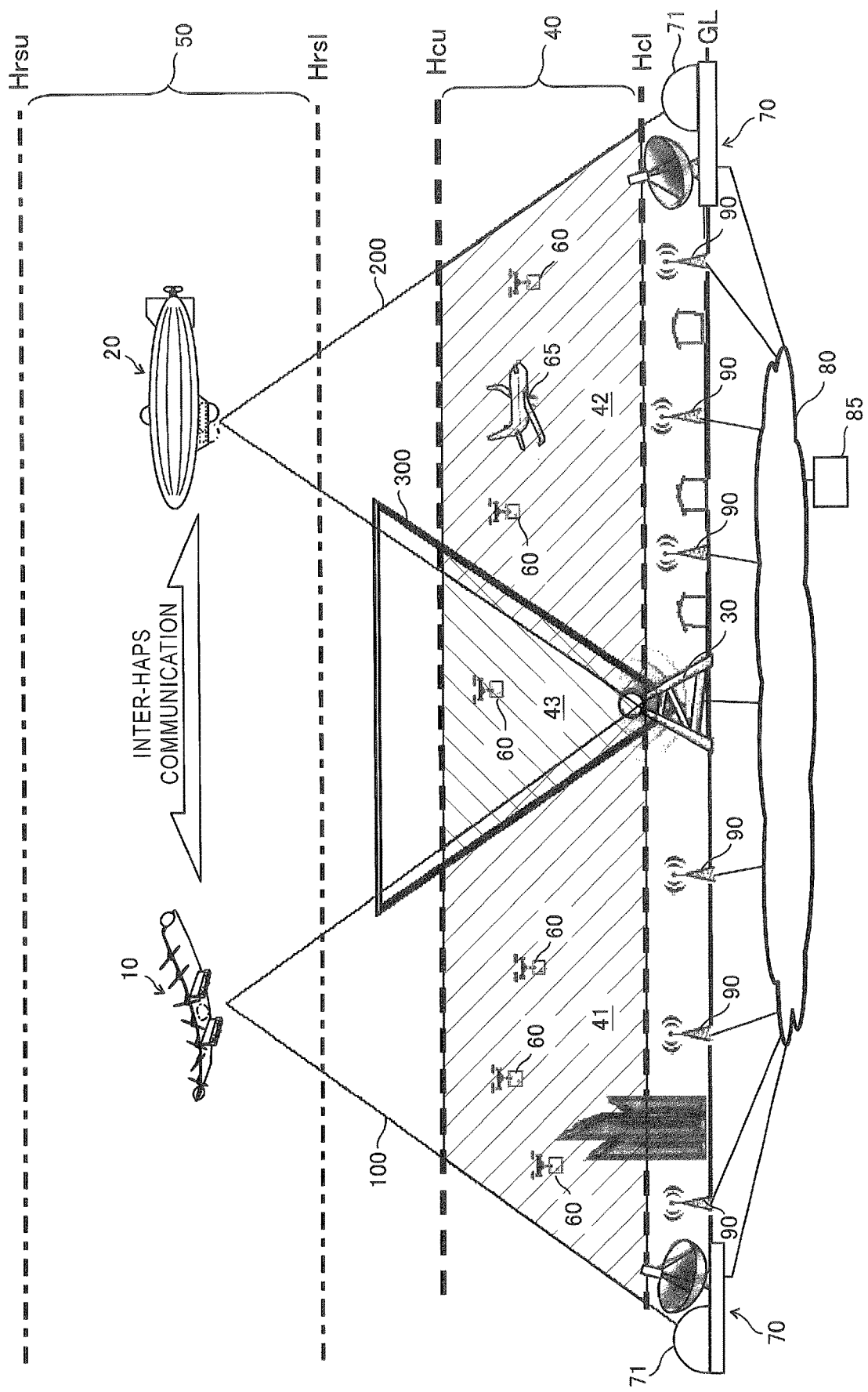
FIG. 1 is a schematic configuration diagram showing an example of an overall configuration of a communication system that realizes a three-dimensional network according to an embodiment of the present invention.

FIG. 1 is a schematic configuration diagram showing an example of an overall configuration of a communication system according to an embodiment of the present invention.

The communication system according to the present embodiment is suitable for realizing a three-dimensional network for mobile communications of the fifth generation or the next and subsequent generations after the fifth generation, which complies with a simultaneous connection to a large number of terminal apparatuses, low delay method, etc. It is noted that, mobile communication standards applicable to communication systems, radio relay stations, base stations, repeaters and terminal apparatuses disclosed herein include the mobile communication standard of the fifth generation and the mobile communication standards of the next and subsequent generations after the fifth generation.

As shown in FIG. 1, the communication system is provided with High-Altitude Platform Stations (HAPSs) (also referred to as "High-Altitude Pseudo Satellite") 10 and 20 as a plurality of aerial-floating type communication relay apparatuses. The HAPSs 10 and 20 are located in an airspace at a predetermined altitude, and form three-dimensional cells (three-dimensional areas) 41 and 42 as indicated by hatching areas in the figure in a cell-formation target airspace 40 at a predetermined altitude. The HAPSs 10 and 20 are those in which relay communication stations are mounted on floating objects (for example, solar plane, airship) that are controlled by autonomous control or external control so as to float or fly and be located in an airspace (floating airspace) 50 with high altitude of 100 [km] or less from the ground level or the sea level.

The airspace 50 in which the HAPSs 10 and 20 are located is, for example, a stratospheric airspace with altitude greater than 11 [km] and less than 50 [km]. The airspace 50 may be an airspace in an altitude of 15 [km] or more and 25 [km] or less where weather conditions are relatively stable, and may be an airspace with altitude of about 20 [km] in particular. Each of Hrsl and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or two or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation spatial area near the ground level covered by a base station 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river or a lake.

In the cell-formation target airspace 40, there is a possibility that a spatial area (spatial area where the three-dimensional cells 41 and 42 are not formed) where the beams 100 and 200 of the HAPSs 10 and 20 do not pass may be occur. In order to complement this spatial area, as shown in the configuration example in FIG. 1, a base station (hereinafter referred to as "ATG station") 30 for forming an ATG (Air To Ground) connection by forming a three-dimensional cell 43 by forming a radial beam 300 from the ground or the sea side upward may be provided.

Further, by adjusting positions of HAPSs 10 and 20 and divergence angles (beam width) of the beams 100 and 200, etc. without using the ATG station 30, the relay communication stations of HAPSs 10 and 20 may form beams 100 and 200 that cover an entire upper end surface of the cell-formation target airspace 40 so that three-dimensional cells are formed all over the cell-formation target airspace 40.

It is noted that, the three-dimensional cell formed by the HAPSs 10 and 20 may be formed so as to reach the ground or the sea surface so that it can communicate with a terminal apparatus located on the ground or on the sea.

The relay communication stations of the HAPSs 10 and 20 respectively forms beams 100 and 200 toward the ground for wirelessly communicating with a terminal apparatus that is a mobile station. The terminal apparatus may be a communication terminal module incorporated in a drone 60 that is an aircraft such as a small helicopter capable of remotely steering, or may be a user apparatus used by a user in an airplane 65. The spatial areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the relay communication stations of the HAPSs 10 and 20 is connected to a core network of a mobile communication network 80 via a feeder station (referred to as "gateway station") 70 which is a relay station installed on the ground or on the sea. A communication between the HAPSs 10 and 20 and the feeder station 70 may be performed by a radio communication using a radio wave such as a microwave, or may be performed by an optical communication using a laser light or the like.

Each of the HAPSs 10 and 20 may autonomously control its own floating movement (flight) and a process in the relay communication station, by executing a control program with a control section including a computer or the like incorporated inside of the HAPS. For example, each of the HAPSs 10 and 20 may acquire its own current position information (for example, GPS position information) and flight status information (for example, flight direction and flight velocity), flight control information (for example, flight route information, flight pattern information, or flight schedule information) stored in advance, information on strong winds (especially gusts) generated around HAPSs 10 and 20, position information on another HAPS located in a peripheral space or the like, and may autonomously control the floating movement (flight) and the process in the relay communication station based on these kinds of information. The flight control information is information for controlling at least one of the flight direction, velocity, altitude, attitude, and flight route of the HAPSs 10 and 20. The flight control information may be stored in advance by a manual operation of an operator, or may be remotely received and stored from a remote control apparatus 85 as a management apparatus.

Herein, the flight route information is information including, for example, position information (for example, latitude, longitude, altitude) on a flight start position, a flight relay position and a flight end position. The flight pattern information is information for identifying various flight patterns as exemplified in FIG. 9 described later. The flight schedule information is information including flight route information or flight pattern information and information on the time or time zone when flying the flight route/flight pattern.

The floating movement (flight) and the process in the relay communication station of each of the HAPSs 10 and 20 may be controlled by the remote control apparatus 85 as a management apparatus provided in a communication center or the like of the mobile communication network 80. In this case, the HAPSs 10 and 20 may incorporate a communication terminal apparatus (for example, mobile communication module) for control so as to be able to receive control information (for example, flight control information) from the remote control apparatus 85 and transmit various information to the remote control apparatus 85, and may be assigned terminal identification information (for example, IP address, telephone number, etc.) so that the HAPSs 10 and 20 can be identified from the remote control apparatus 85. The MAC address of the communication interface may be used for identification of the communication terminal apparatus for control. Moreover, each of the HAPSs 10 and 20 may transmits information regarding the floating movement (flight) of the own HAPS or a surrounding HAPS and/or the process at the relay communication station, information such as observation data or the like acquired by various sensors, to a predetermined destination such as the remote control apparatus 85.

Strong winds such as gusts generated around the HAPSs 10 and 20 can be detected by, for example, a Doppler radar 71 provided at a feeder station 70 on the ground. The Doppler radar 71 is an apparatus that irradiates a detection target area with microwaves or laser light, and observes the moving velocity and direction (whether it is approaching or moving away from the radar) of particles corresponding to the direction and velocity of the wind by the Doppler effect using the reflected waves from raindrops and cloud particles existing in the detection target area.

It is noted that, a detection target space for detecting the strong wind such as the gust with the Doppler radar 71 may be narrowed down to a space that is predicted to affect subsequent flights based on information on current positions and flight routes of the own HAPSs 10 and 20. In this case, the strong wind can be detected by the Doppler radar 71 more efficiently in a short time.

Furthermore, the detection target space for detecting the strong wind such as the gust with the Doppler radar 71 may be narrowed down to a space where the strong wind such as the gust is more likely to occur, based on at least one of statistical values of past upper-air meteorological observation data, latest upper-air meteorological observation data and meteorological measurement data measured by environmental-information measuring apparatuses installed in the own HAPSs 10 and 20.

The upper-air meteorological observation data is, for example, an upper-air meteorological observation data that is observed twice a day at the same time at 800 locations around the world using a meteorological observation device (radiosonde). The radiosonde measures temperature, pressure (altitude), humidity, etc. in an upper airspace while ascending at about 360 m/min by buoyancy of a balloon, and transmits each measured value to the ground by radio waves. Among the radiosondes, those that calculate the wind direction and velocity using GPS signals are called as "GPS sondes", and the GPS sondes receive radio waves of a plurality of GPS satellites and obtain the wind direction and velocity by using frequency deviations of the GPS satellite signals caused by the movement of the GPS sondes. The upper-air meteorological observation data can be obtained from the Japan Meteorological Agency's WEB site, for example, in a data format such as an upper-air weather map at each of a plurality of altitudes, a graph showing a relationship between altitude and wind direction/wind velocity, a graph showing a relationship between altitude and temperature/humidity.

There are various kinds of sensors such as a barometer, a thermometer and a hygrometer, as an environmental-information measuring apparatus provided in the HAPSs 10 and 20, and these sensors can measure and acquire information such as atmospheric pressure, temperature, and humidity around the HAPSs 10 and 20.

Figure 2:
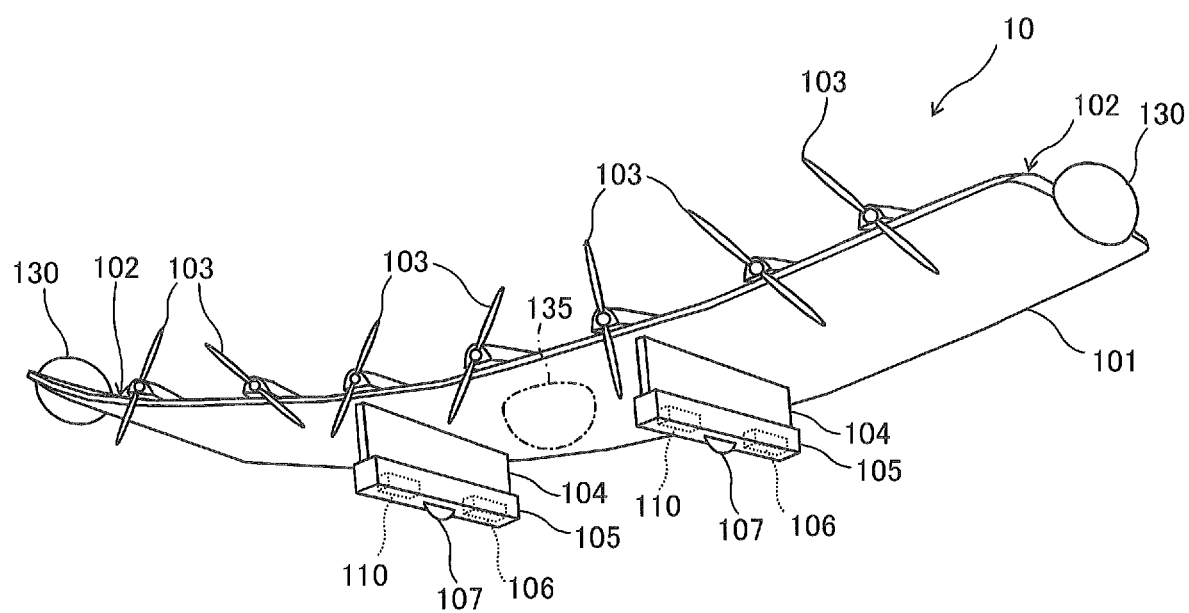
FIG. 2 is a perspective view showing an example of a HAPS used in the communication system according to the embodiment.

FIG. 2 is a perspective view showing an example of the HAPS 10 used in a communication system in the embodiment.

The HAPS 10 in FIG. 2 is a solar-plane type HAPS, and has a main wing section 101 with both ends in the longitudinal direction running upward, and a plurality of motor-driven propellers 103 as propulsion apparatuses of a bus-motive power system provided at one end edge portion of the main wing section 101 in the lateral direction. A solar power generation panel (hereinafter, referred to as "solar panel") 102 as a solar-photovoltaic power generator section having a solar-photovoltaic power generation function is provided on an upper surface of the main wing section 101. Pods 105 as a plurality of apparatus accommodating sections for accommodating the mission equipment are connected to the two positions in the longitudinal direction of the lower surface of the main wing section 101 via a plate-like connecting section 104. Inside each pod 105, a relay communication station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay process by the relay communication station 110 is executed.

The solar-plane type HAPS 10 can float with lift force by, for example, performing a circular turning flight, or performing a flight along a figure of "8", and can float to stay in a predetermined range in the horizontal direction at a predetermined altitude. It is noted that, the solar-plane type HAPS 10 can also fly like a glider when the propeller 103 is not rotationally driven. For example, the solar-plane type HAPS 10 can rise up to a high position when electric power of the battery 106 is surplus by power generation of the solar panel 102 such as in daytime, and can fly like a glider by stopping the power supply from the battery 106 to the motor when an electric power cannot be generated by the solar panel 102, such as at night. the solar panel 102

The HAPS 10 is also provided with an optical antenna apparatus 130 complying with a three-dimensional directivity as a communication section used for an optical communication with another HAPS or an artificial satellite. It is noted that, although the optical antenna apparatuses 130 are disposed at both ends in the longitudinal direction of the main wing section 101 in the example in FIG. 2, the optical antenna apparatuses 130 may be disposed at other positions of the HAPS 10. It is also noted that, the communication section used for optical communication with the other HAPS or the artificial satellite is not limited to that of performing such optical communication, and the communication may be a radio communication by another method such as radio communication with radio waves such as microwaves.

As shown by the alternate long and short dash line in FIG. 2, the HAPS 10 may be provided with a Doppler radar 135 that detects a strong wind such as a gust that is generated and approaching around the HAPS.

Figure 3:
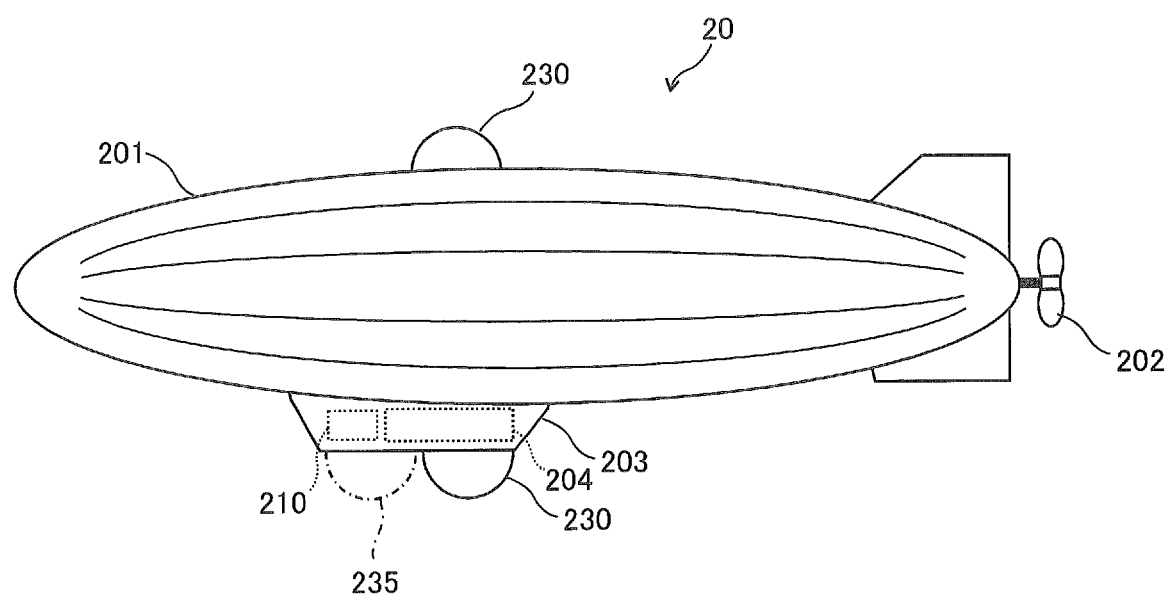
FIG. 3 is a side view showing another example of a HAPS used in the communication system according to the embodiment.

FIG. 3 is a perspective view showing another example of the HAPS 20 used in a communication system according to the embodiment.

The HAPS 20 in FIG. 3 is an unmanned-airship type HAPS, and can mount a large capacity battery since the payload is large. The HAPS 20 includes an airship body 201 filled with gas such as helium gas for floating by floating power, motor-driven propellers 202 as propulsion apparatuses of bus-motive power system, and an equipment accommodating section 203 in which mission equipment is accommodated. A relay communication station 210 and a battery 204 are accommodated in the equipment accommodating section 203. The motor of the propeller 202 is rotationally driven by an electric power supplied from the battery 204, and a radio relay process by the relay communication station 210 is executed.

It is noted that, a solar panel having a photovoltaic power generation function may be provided on the upper surface of the airship body 201, and the electric power generated by the solar panel may be stored in the battery 204.

The unmanned airship type HAPS 20 is also provided with an optical antenna apparatus 230 complying with a three-dimensional directivity as a communication section used for optical communication with another HAPS or an artificial satellite. It is noted that, although the optical antenna apparatus 230 is disposed on the upper surface of the airship body 201 and the lower surface of the equipment accommodating section 203 in the example in FIG. 3, the optical antenna apparatus 230 may be disposed on other parts of the HAPS 20. It is also noted that, the communication section used for optical communication with the other HAPS or the artificial satellite is not limited to that of performing such optical communication, and the communication may be a radio communication by another method such as a radio communication with radio waves such as microwaves.

As shown by the alternate long and short dash line in FIG. 3, the HAPS 20 may also be provided with a Doppler radar 235 that detects a strong wind such as a gust that is generated and approaching around the HAPS.

Figure 4:
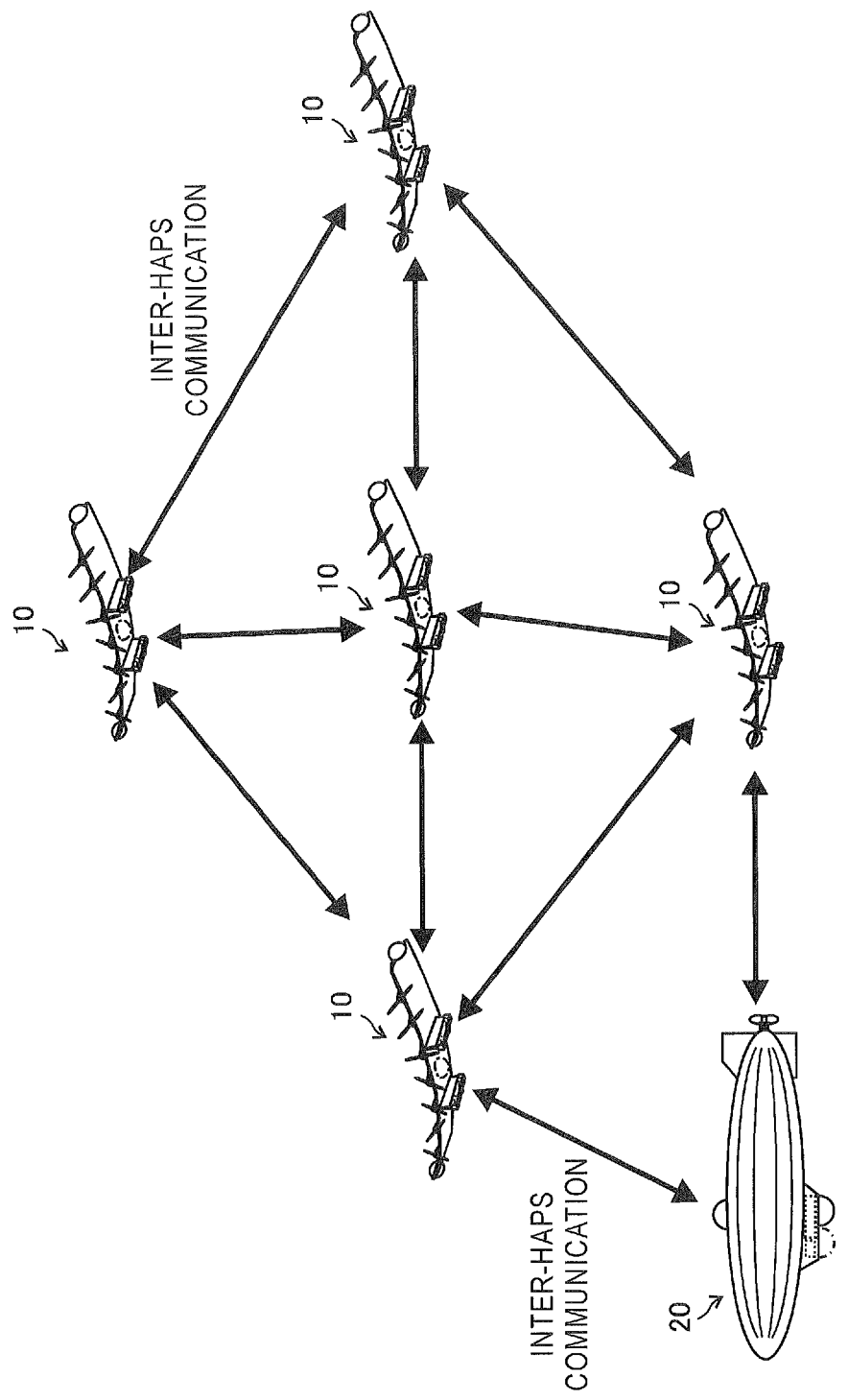
FIG. 4 is an illustration showing an example of a radio network formed in an upper airspace by a plurality of HAPSs according to the embodiment.

FIG. 4 is an illustration showing an example of a radio network formed in an upper airspace by a plurality of HAPSs 10 and 20 according to the embodiment.

The plurality of HAPSs 10 and 20 are configured to be capable of performing an inter-HAPS communication with each other by the optical communication in the upper airspace, and form a radio communication network having excellent robustness, which can stably realize a three-dimensional network over a wide area. This radio communication network can also function as an ad hoc network by a dynamic routing according to various environments and various information. The foregoing radio communication network can be formed to have various two-dimensional or three-dimensional topologies, and may be, for example, a mesh-type radio communication network as shown in FIG. 4.

Figure 5:
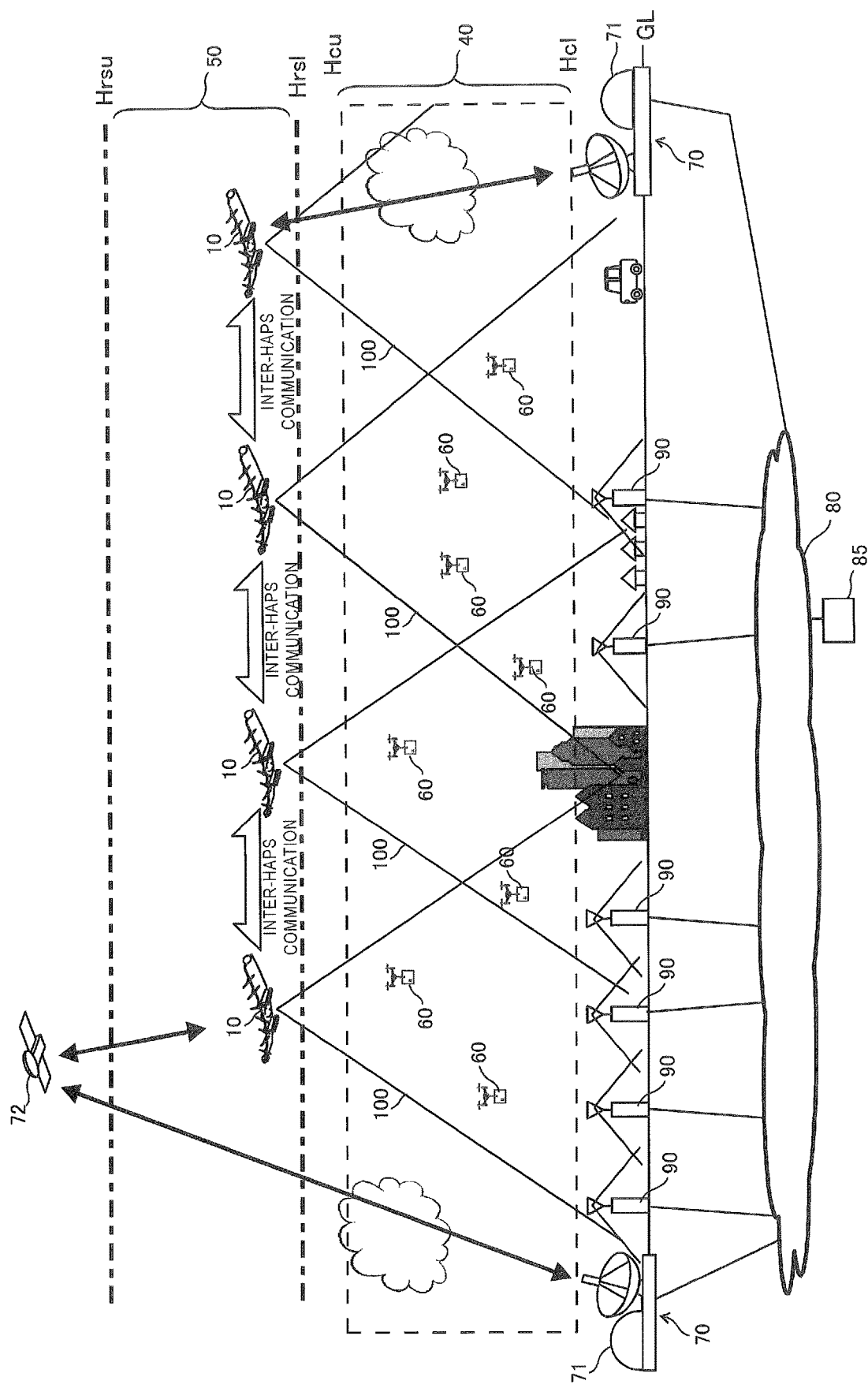
FIG. 5 is a schematic configuration diagram showing an example of an overall configuration of a communication system that realizes a three-dimensional network according to still another embodiment.

FIG. 5 is a schematic configuration diagram showing an example of an overall configuration of a communication system according to another embodiment.

It is noted that, in FIG. 5, configuration elements similar to those in FIG. 1 described above are denoted by the same reference numerals and explanations thereof are omitted.

In the embodiment of FIG. 5, a communication between the HAPS 10 and the core network of the mobile communication network 80 is performed via the feeder station 70 and a low-orbital artificial satellite 72. In this case, a communication between the artificial satellite 72 and the feeder station 70 may be performed by a radio communication using radio waves such as microwaves, or may be performed by an optical communication using a laser light or the like. A communication between the HAPS 10 and the artificial satellite 72 is performed by an optical communication using a laser light or the like.

Figure 6:
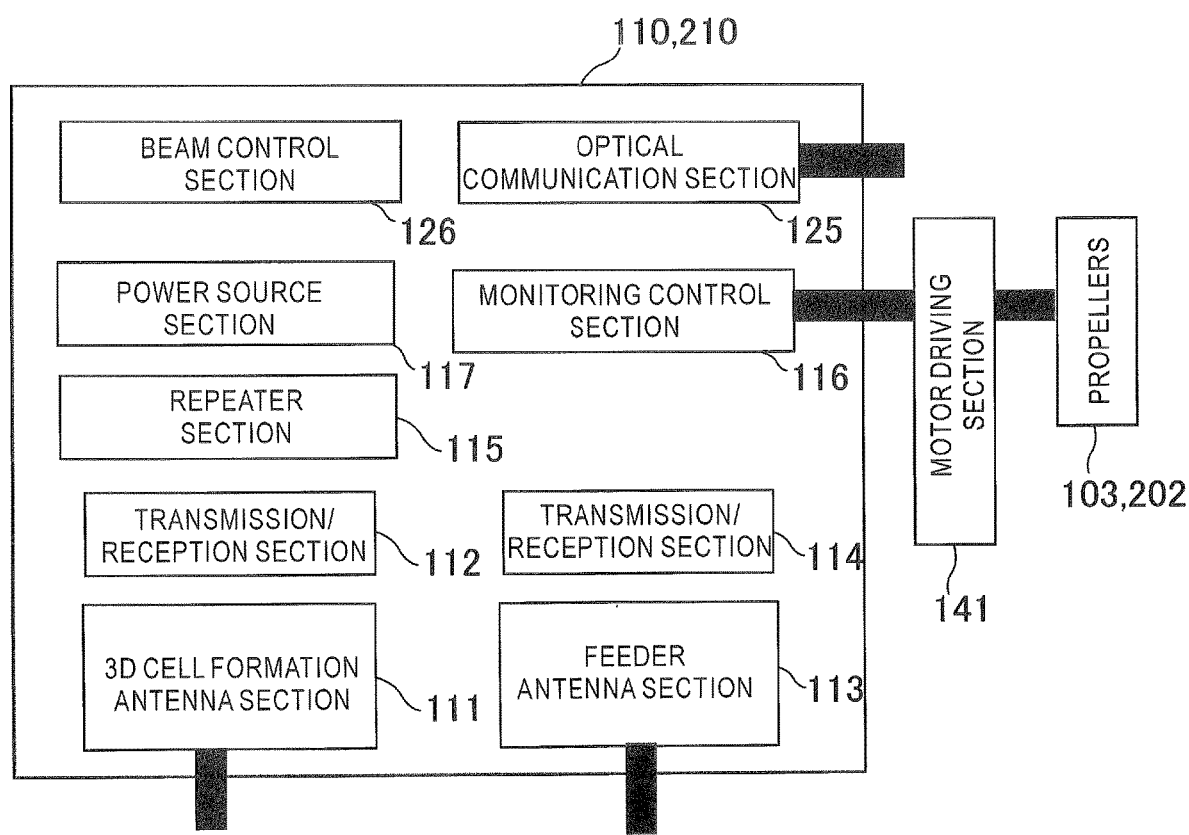
FIG. 6 is a block diagram showing a configuration example of a relay communication station of a HAPS according to the embodiment.

FIG. 6 is a block diagram showing a configuration example of the relay communication stations 110 and 210 of the HAPSs 10 and 20 according to the embodiment. The relay communication stations 110 and 210 in FIG. 6 are examples of repeater-type relay communication stations. Each of the relay communication stations 110 and 210 includes a 3D cell-formation antenna section 111, a transmission/reception section 112, a feeder antenna section 113, a transmission/reception section 114, a repeater section 115, a monitoring control section 116, and a power source section 117. Furthermore, each of the relay communication stations 110 and 210 includes an optical communication section 125 used for the inter-HAPS communication and the like, and a beam control section 126.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 constitutes a first radio communication section together with the 3D cell-formation antenna section 111, has a transmission/reception duplexer (DUP: DUPlexer) and an amplifier, etc., transmits radio signals to the terminal apparatuses located in the three-dimensional cells 41 and 42, and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 constitutes a second radio communication section together with the feeder antenna section 113, has a transmission/reception duplexer (DUP: DUPlexer) and an amplifier, etc., and transmits/receives radio signals to/from the feeder station 70 via the feeder antenna section 113.

The repeater section 115 relays signals of the transmission/reception section 112 transmitted and received between the terminal apparatus, and signals of the transmission/reception section 114 transmitted and received between the feeder station 70. The repeater section 115 may have a frequency conversion function.

The monitoring control section 116 is configured with, for example, a CPU and a memory, etc., and monitors an operation processing status of each section in the HAPSs 10 and 20 and controls each section, by executing a preinstalled program. In particular, the monitoring control section 116 controls a motor driving section 141 that drives the propellers 103 and 202 to move the HAPSs 10 and 20 to target positions, and controls the HAPSs 10 and 20 to stay in the vicinity of the target positions, by executing a control program.

The power source section 117 supplies the electric power outputted from the batteries 106 and 204 to each section in the HAPSs 10 and 20. The power source section 117 may have a function for storing the electric power generated by the solar power generation panel or the like and an electric power supplied from the outside in the batteries 106 and 204.

The optical communication section 125 communicates with surrounding other HAPSs 10 and 20 or artificial satellite 72 via an optical communication medium such as laser light. This communication enables a dynamic routing that dynamically relays a radio communication between the terminal apparatus such as the drone 60 and the mobile communication network 80, and can enhance the robustness of the mobile communication system by backing up and relaying wirelessly with the other HAPSs when one of the HAPSs fails.

The beam control section 126 controls a direction and intensity of a beam of laser light or the like used for the inter-HAPS communication or the communication with the artificial satellite 72, and performs a control so as to switch another HAPSs (relay communication stations) that performs a communication by an optical beam such as a laser light according to a change in relative positions with neighboring another HAPS (relay communication station). This control may be performed based on, for example, a position and posture of the HAPS itself, a position of the surrounding HAPS and the like. Information on the position and attitude of the HAPS itself may be acquired based on output of a GPS receiver, a gyro sensor, an acceleration sensor and the like incorporated in the HAPS, and information on the position of the surrounding HAPS may be acquired from the remote control apparatus 85 provided in the mobile communication network 80 or another HAPS management server.

Figure 7:
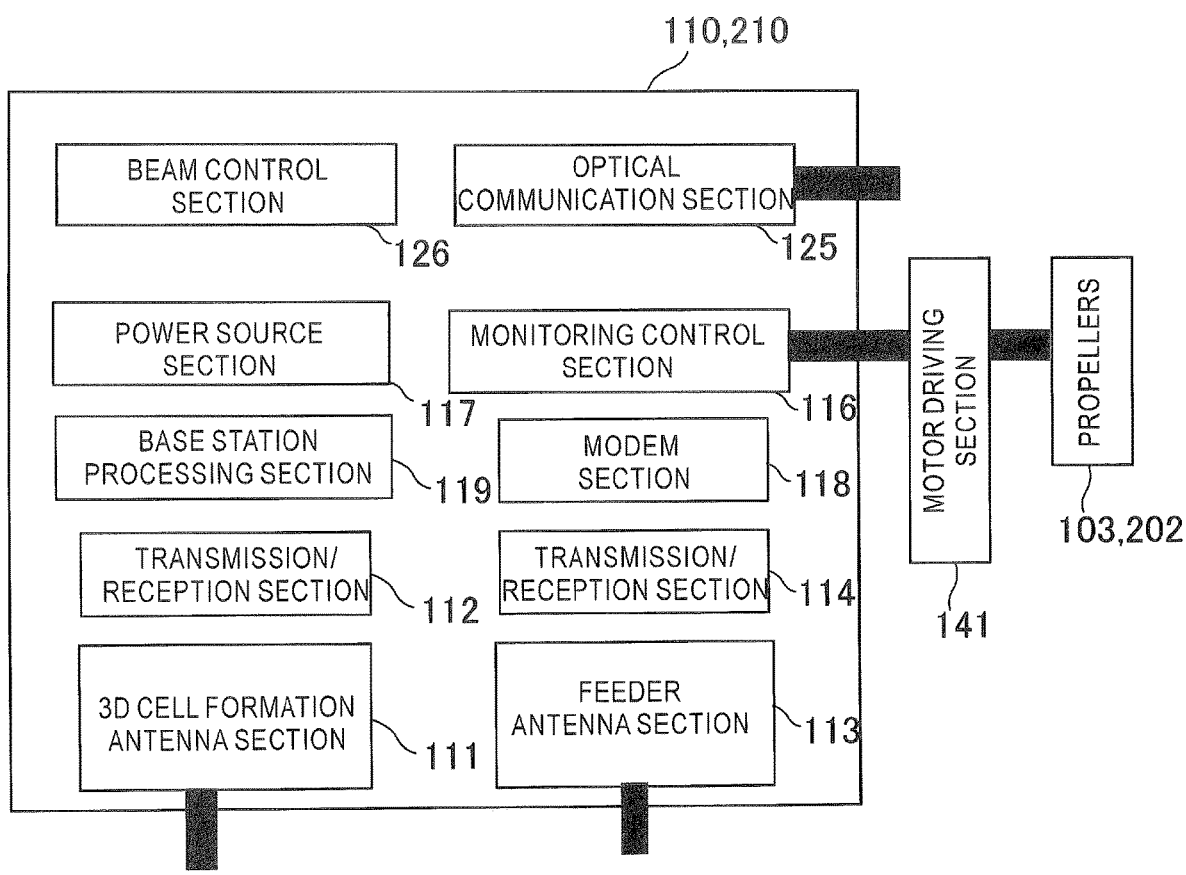
FIG. 7 is a block diagram showing another configuration example of a relay communication station of a HAPS according to the embodiment.

FIG. 7 is a block diagram showing another configuration example of the relay communication stations 110 and 210 of the HAPSs 10 and 20 according to the embodiment.

The relay communication stations 110 and 210 in FIG. 7 are examples of base-station type of relay communication stations.

It is noted that, in FIG. 7, configuration elements similar to those in FIG. 6 are denoted by the same reference numerals and explanations thereof are omitted. Each of the relay communication stations 110 and 210 in FIG. 7 further includes a modem section 118, and includes a base-station processing section 119 instead of the repeater section 115. Further, each of the relay communication stations 110 and 210 includes the optical communication section 125 and the beam control section 126.

The modem section 118, for example, performs a demodulation processing and a decoding processing for a reception signal received from the feeder station 70 via the feeder antenna section 113 and the transmission/reception section 114, and generates a data signal to be outputted to the base-station processing section 119 side. The modem section 118 performs an encoding processing and a modulation processing for the data signal received from the base-station processing section 119 side, and generates a transmission signal to be transmitted to the feeder station 70 via the feeder antenna section 113 and the transmission/reception section 114.

The base-station processing section 119 has, for example, a function as an e-NodeB that performs baseband processing based on a method conforming to the standard of LTE/LTE-Advanced. The base-station processing section 119 may process in a method conforming to a future standard of mobile communication such as the fifth generation.

The base-station processing section 119, for example, performs a demodulating process and a decoding process for a reception signal received from a terminal apparatus located in the three-dimensional cells 41 and 42 via the 3D cell-formation antenna section 111 and the transmission/reception section 112, and generates a data signal to be outputted to the modem section 118 side. The base-station processing section 119 performs an encoding process and a modulating process for the data signal received from the modem section 118 side, and generates a transmission signal to be transmitted to the terminal apparatus in the three-dimensional cells 41 and 42 via the 3D cell-formation antenna section 111 and the transmission/reception section 112.

Figure 8:
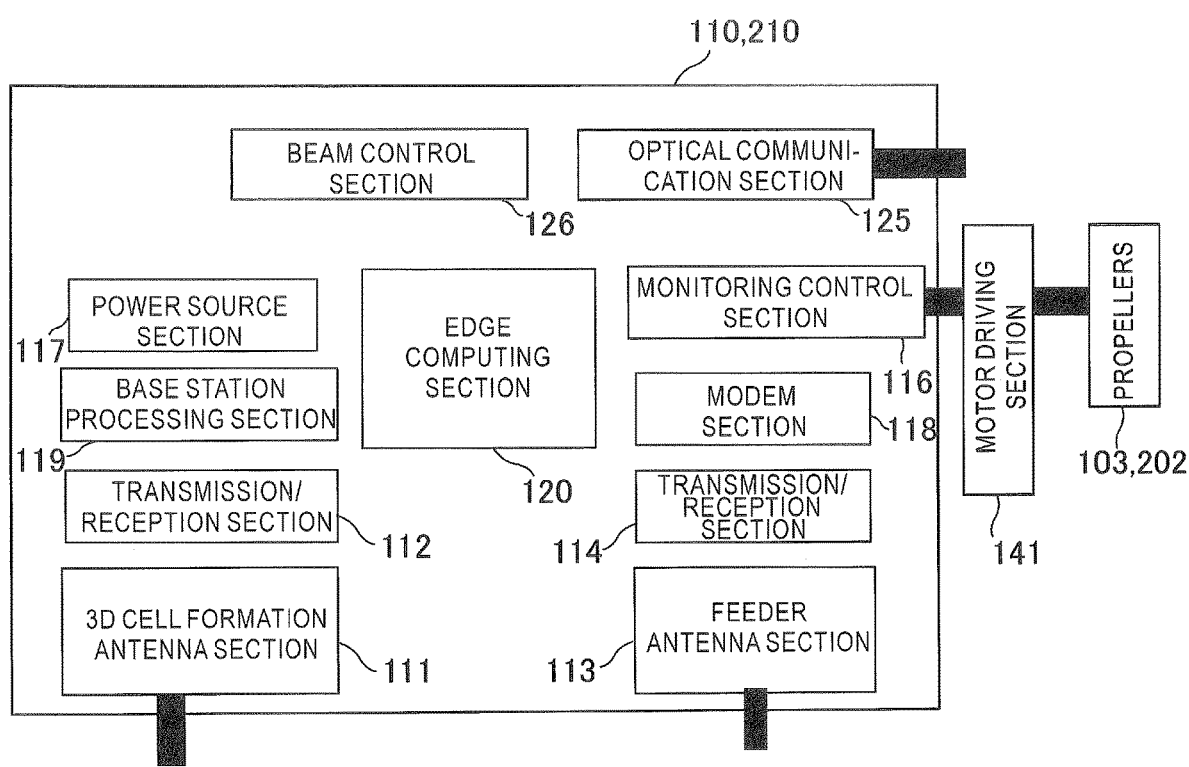
FIG. 8 is a block diagram showing still another configuration example of a relay communication station of a HAPS according to the embodiment.

FIG. 8 is a block diagram showing still another configuration example of the relay communication stations 110 and 210 of the HAPSs 10 and 20 according to the embodiment.

The relay communication stations 110 and 210 in FIG. 8 are examples of high-performance base-station type of relay communication stations having an edge computing function. It is noted that, in FIG. 8, configuration elements similar to those in FIG. 6 and FIG. 7 are denoted by the same reference numerals and explanations thereof are omitted. Each of the relay communication stations 110 and 210 in FIG. 8 further includes an edge computing section 120 in addition to the configuration elements in FIG. 7.

The edge computing section 120 is configured with, for example, a compact computer, and can perform various types of information processing relating to a radio relay and the like in the relay communication stations 110 and 210 of the HAPSs 10 and 20, by executing the preinstalled program.

The edge computing section 120, for example, determines a transmission destination of a data signal based on a data signal received from a terminal apparatus located in the three-dimensional cells 41 and 42, and performs a process of switching a relay destination of communication based on the determination result. More specifically, in case that a transmission destination of the data signal outputted from the base-station processing section 119 is a terminal apparatus located in the own three-dimensional cells 41 and 42, instead of passing the data signal to the modem section 118, edge computing section 120 returns the data signal to the base-station processing section 119, and transmits the data signal to the terminal apparatus of the transmission destination located in its own three-dimensional cells 41 and 42. On the other hand, in case that the transmission destination of the data signal outputted from the base-station processing section 119 is a terminal apparatus located in a cell other than the own three-dimensional cells 41 and 42, the edge computing section 120 passes the data signal to the modem section 118 and transmits to the feeder station 70, and transmits the data signal to a terminal apparatus of the transmission destination located in the other cell of the transmission destination via the mobile communication network 80.

The edge computing section 120 may execute a process of analyzing information received from a large number of terminal apparatuses located in the three-dimensional cells 41 and 42. This analysis result may be transmitted to the large number of terminal apparatuses located in the three-dimensional cells 41 and 42, or may be transmitted to a server apparatus of the mobile communication network 80 or the like.

Duplex methods of uplink and downlink for radio communication with a terminal apparatus via the relay communication stations 110 and 210 are not limited to specific methods, and may be, for example, a time division duplex method (Time Division Duplex: TDD) or a frequency division duplex method (Frequency Division Duplex: FDD). An access method for radio communication with a terminal apparatus via the relay communication stations 110 and 210 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different communication terminal apparatuses at the same time/same frequency or a plurality of different base stations transmit signals to one terminal apparatus at the same time/same frequency.

It is noted that, in the following description, although only the solar-plane type HAPS 10 is used, the unmanned-airship type HAPS 20 may be used, or these HAPSs 10 and 20 may be mixed.

Figure 9:
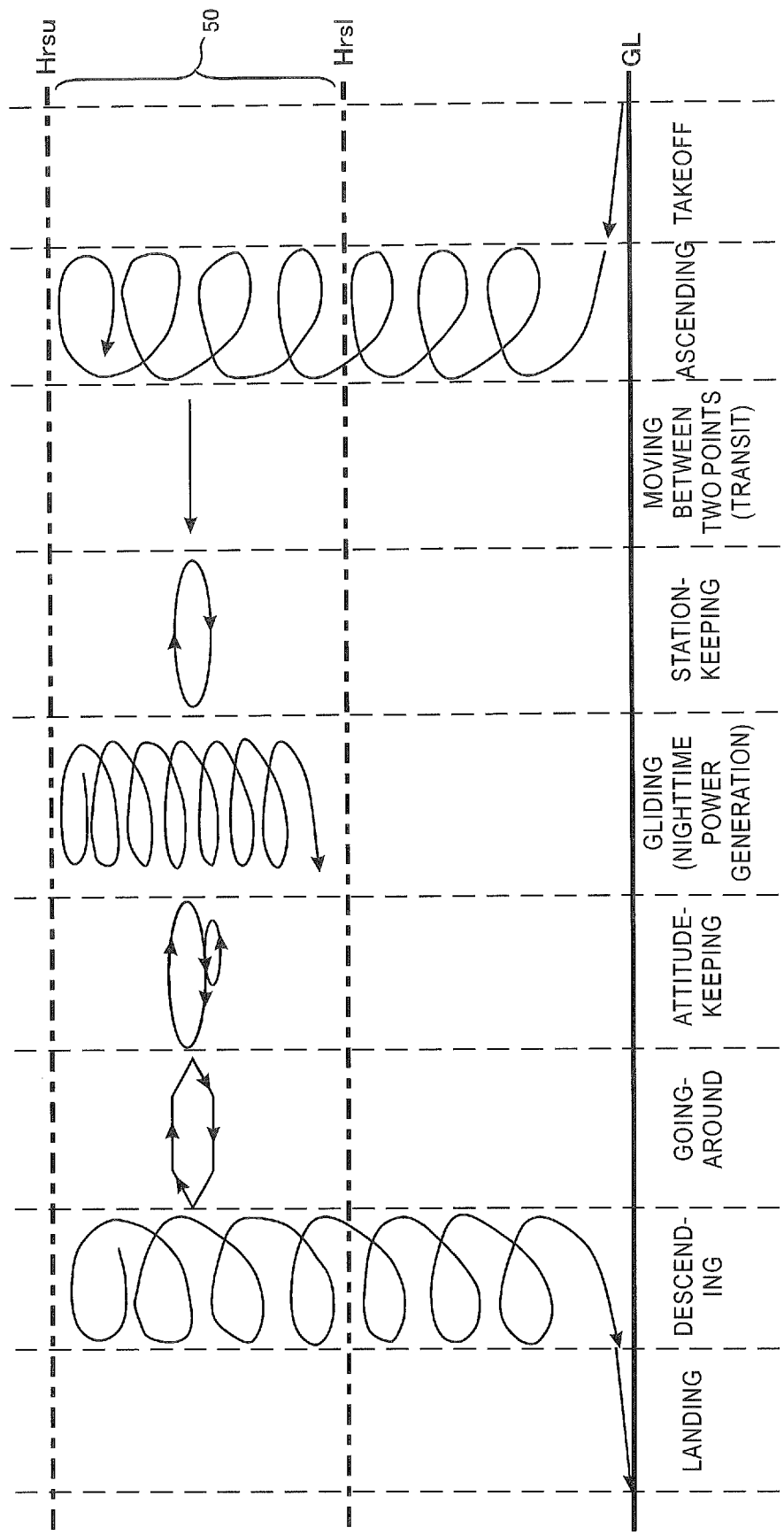
FIG. 9 is an illustration exemplifying various flight patterns of a HAPS according to the embodiment.

FIG. 9 is an illustration exemplifying various flight patterns of the HAPS 10 according to the embodiment. FIG. 9 exemplifies nine types of flight patterns in a series of flights of the HAPS 10 from takeoff to landing. It is noted that, in FIG. 9, configuration elements similar to those in FIGS. 1 and 5 described above are denoted by the same reference numerals and explanations thereof are omitted.

The HAPS 10 in the present embodiment performs an optimum flight control for each of a plurality of flight patterns in FIG. 9 so as to be the most energy-saving as follows, based on environmental information such as an airflow and apparatus-status information of the HAPS 10 such as a velocity relative to the air.

"Takeoff" in FIG. 9 is a flight pattern when the HAPS 10 takes off from the ground (or, sea surface or a ship on the sea). In this takeoff flight pattern, a flight control is performed so that the HAPS 10 takes off in a head-wind status o toward the airflow so that it can take off quickly.

"Ascending" in FIG. 9 is a flight pattern when the HAPS 10 rises to a predetermined airspace 50 (for example, an airspace in the stratosphere) after taking off. In this ascending flight pattern, a flight control is performed so that the velocity of the HAPS 10 relative to the air is constant and ascending without resisting the airflow. In areas with strong winds such as westerlies and easterly winds, a flight control is performed so that the HAPS 10 rises towards windward.

"Moving between two points (transit)" in FIG. 9 is a flight pattern when the HAPS 10 moves from a position where the rise is completed to a staying position (communication-service providing point) during operation for providing the communication service. In the flight pattern of this moving between two points, a flight control is performed so as to move at a constant velocity relative to the air aiming at an altitude where the wind is weak. In case that a moving destination is leeward of a low-altitude and windy area, a flight control is performed so as to dare to lower the altitude and move by being swept away, and so as to raise the altitude when the HAPS 10 reaches a predetermined location. When being swept away by the airflow, a flight control may be performed so as to move while generating electricity in a gliding flight.

"Station-keeping" in FIG. 9 is a flight pattern when the HAPS 10 stays at a staying position during operation. In this flight pattern of the station-keeping, a flight control is performed so as to stay within a predetermined staying area. In this flight pattern of the station-keeping, a flight control may be performed so as to repeat a flight in which a solar-photovoltaic power generation is performed by the solar panel 102 in the daytime when the solar panel is exposed to sunlight and a flight in which a nighttime-airflow power generation is performed by the gliding at night described below.

"Gliding (nighttime power generation)" in FIG. 9 is a flight pattern in which the HAPS 10 generates an electric power by rotating a propeller (wind power generation) at night. In this gliding (nighttime power generation) flight pattern, a flight control is performed so as to glide within a predetermined area while slowly turning by using potential energy.

"Attitude-keeping" in FIG. 9 is a flight pattern for maintaining an attitude so that the power generation by the solar panel 102 is efficiently performed during a stay of the HAPS 10. In this flight pattern of the attitude-keeping, a flight control is performed so as to fly in a flight path (for example, a going-around flight path with a modified oval shape) that maintains an attitude so as to maximize a time for a light receiving surface of the solar panel 102 to face the sun.

"Going-around" in FIG. 9 is a flight pattern when the HAPS 10 performs a going-around between a plurality of stay locations. In the moving between two points of this going-around flight pattern, a flight control is performed so as to move at a constant velocity relative to the air aiming at an altitude where the wind is weak, similar to the foregoing flight pattern of moving between two points. In case that a moving destination is leeward of a low-altitude and windy area, a flight control is performed so as to dare to lower the altitude and move by being swept away, and so as to rise the altitude when the HAPS 10 reaches a predetermined location. When being swept away by the airflow, a flight control may be performed so as to move while generating electricity in a gliding flight.

"Descending" in FIG. 9 is a flight pattern when the HAPS 10 descends from a predetermined airspace 50 (for example, an airspace in the stratosphere) to a location near the ground (or the sea surface). In this descending flight pattern, a flight control is performed so that the HAPS 10 descends on a flight path in which the HAPS 10 does not go against a wind as much as possible.

"Landing" in FIG. 9 is a flight pattern when the HAPS 10 lands on the ground (or the sea surface or a ship on the sea). In this landing flight pattern, a flight control is performed so that the HAPS 10 lands on a flight path in which the HAPS 10 that does not go against a wind as much as possible.

In the present embodiment, there is a fear that the HAPS 10 in flight falls due to unstable attitude of the aircraft by receiving a strong wind such as a gust caused by a rapid upward airflow or downward airflow (downburst), etc. generated in an upper airspace. Accordingly, in the present embodiment, the fall of the HAPS 10 is prevented by detecting a strong wind such as a gust generated around the HAPS 10, determining flight control information to reduce an influence based on the detection result, and controlling the flight of HAPS 10 based on the flight control information.

The flight control information includes information for controlling at least one of the flight direction, velocity, altitude, attitude, and flight route of HAPS 10. The flight control information is determined, for example, so that the HAPS 10 flies on a flight route or flight pattern that avoids the detected strong-wind generation spatial areas, and the HAPS 10 flies by changing the attitude of the HAPS 10 in the direction in which the detected strong wind becomes a head wind.

Figure 10:
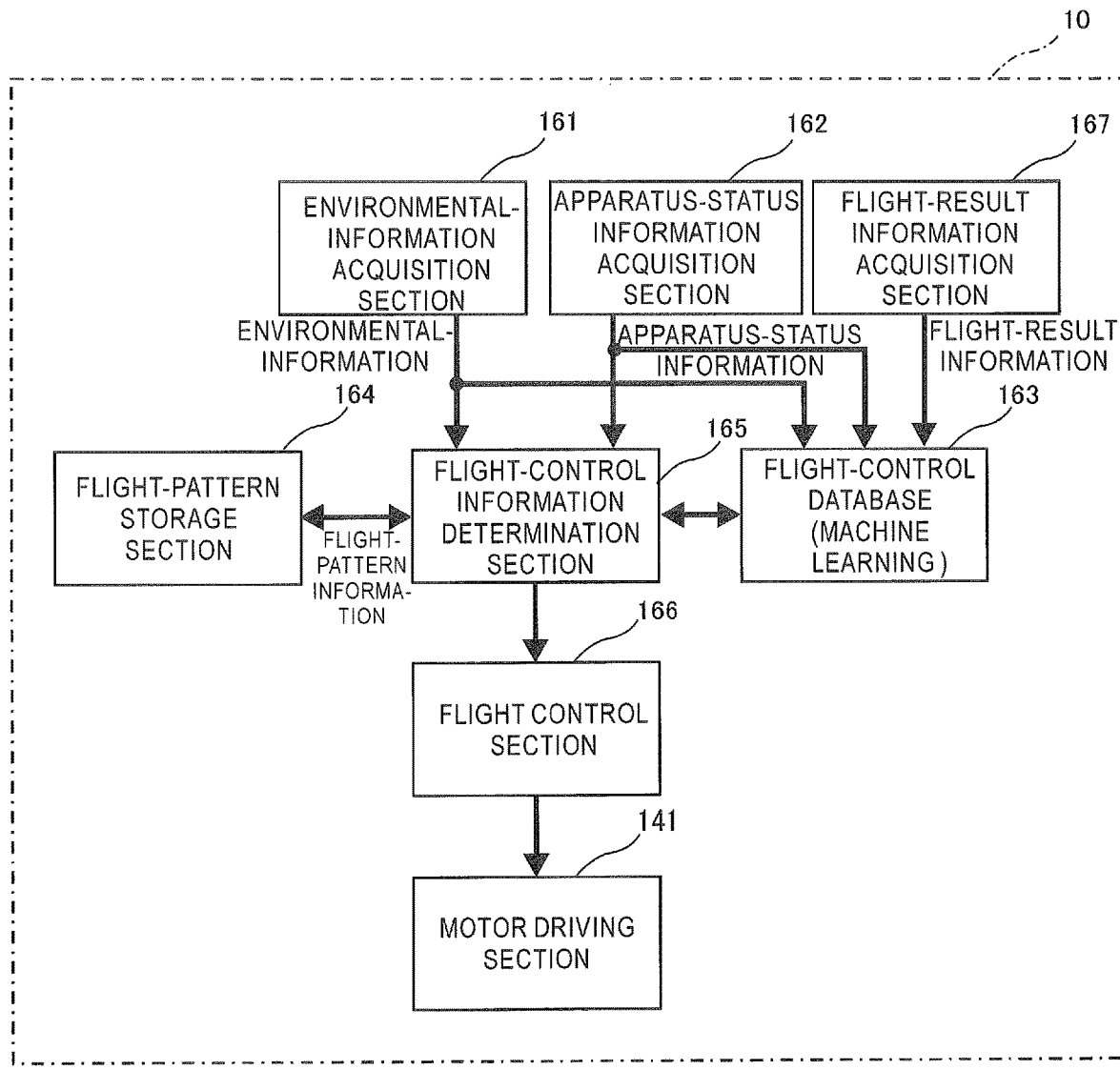
FIG. 10 is a functional block diagram showing a configuration example of a flight control system of a HAPS according to the embodiment.

FIG. 10 is a functional block diagram showing a configuration example of a flight control system of the HAPS 10 according to the embodiment. The flight control system in FIG. 10 is an example of a flight control system of autonomous control type in which the HAPS 10 itself determines flight control information and controls the flight.

In FIG. 10, the flight control system of the HAPS 10 includes an environmental-information acquisition section 161, an apparatus-status information acquisition section 162, a flight control database 163, a flight-pattern storage section 164, a flight-control information determination section 165, a flight control section 166, a motor driving section 141 and a flight-result information acquisition section 167. It is noted that, at least a part of the flight-control database 163, the flight-pattern storage section 164, the flight-control information determination section 165 and the flight control section 166 may be configured with the above-mentioned edge computing section 120 (see FIG. 8).

The environmental-information acquisition section 161 acquires environmental information including detection information on a strong wind generated around the HAPS 10 (hereinafter, also referred to as "strong-wind detection information"). The strong wind generated around the HAPS 10 can be detected by observing a direction and velocity of a wind around the HAPS 10 by, for example, the Doppler radar 71 installed at the feeder station 70 on the ground. The environmental-information acquisition section 161 can acquire the strong-wind detection information around the HAPS 10 detected by the Doppler radar 71 by receiving it via the remote control apparatus 85 which is a management apparatus of the HAPS 10. It is noted that, if the HAPS 10 is provided with the Doppler radar 135, it is possible to acquire the strong-wind detection information on a gust or the like generated around the HAPS 10, from the Doppler radar 135.

The apparatus-status information acquisition section 162 acquires apparatus-status information indicating a status of the own HAPS 10. The apparatus-status information includes information on a current position of the own HAPS 10 and a setting flight path that is set in advance. The apparatus-status information may include at least one information on a velocity relative to the air, a velocity relative to the ground and a propulsion direction of the own HAPS 10. As a measurement device for measuring the apparatus-status information, which is provided in the HAPS 10, there are various sensors such as an accelerometer, an angular velocity meter, a magnetometer (direction sensor), an absolute pressure gauge, a differential pressure gauge, a GPS receiver and an attitude angle sensor, and these sensors can measure and acquire information such as a current position (latitude, longitude, altitude), a velocity relative to the air, a velocity relative to the ground and a propulsion direction of the HAPS 10.

The flight control database 163 stores a relationship data indicating a relationship between environmental information including a position and type of a strong wind such as a gust generated around the HAPS 10, flight control information determined based on the detection result of the strong wind such as the gust, and the apparatus status information. The flight control database 163 also has an artificial intelligence (AI) function that performs a machine learning based on the flight control information, the environmental information, the apparatus-status information and actual flight-control result information (for example, a position and attitude of the HAPS 10, a surrounding wind velocity and the like) after control, and updates the relationship data. For example, the machine learning is performed to modify the relationship data so that the influence of the strong wind such as the gust is minimized, for each of the environmental information including the position and type of the strong wind such as the gust before control and the flight pattern.

The flight-pattern storage section 164 stores a plurality of flight patterns that can be selected in the HAPS 10.

The flight-control information determination section 165 refers to the flight control database 163 based on the latest acquisition data of the environmental information and the apparatus-status information for the flight pattern selected from the plurality of types of flight patterns stored in the flight-pattern storage section 164, and determines flight control information (for example, a value of control parameter for rotational drive of each of the plurality of propellers 103) that minimizes the influence of the strong wind such as the gust.

The flight control section 166 transmits a control signal to the motor driving section 141 of each propeller 103 of the HAPS 10 based on the flight control information determined by the flight-control information determination section 165, and controls a rotation of each propeller 103 individually. By the individual control of the rotation of each propeller 103, it is possible to control a traveling direction, velocity, attitude (roll angle (bank angle), pitch angle, yaw angle) of the flying HAPS 10. It is noted that, as a method of the flight control of the HAPS 10, instead of the individual control of the rotation of the propeller 103 or in addition to the individual control of the rotation of the propeller 103, a method of providing a moving blade (for example, an aileron, a rudder, an elevator or the like) on the HAPS 10 and controlling the moving blade may be adopted.

The flight-result information acquisition section 167 acquires flight result information of the HAPS 10 (for example, a position and attitude of the HAPS 10, a surrounding wind velocity and the like) when the flight is controlled by the foregoing determined flight control information. This flight result information is measured by, for example, a measuring apparatus such as a GPS receiver, a gyro sensor an anemometer or the like, which is provided in the HAPS 10, and is used in the machine learning in the flight control database 163 described above.

Figure 11:
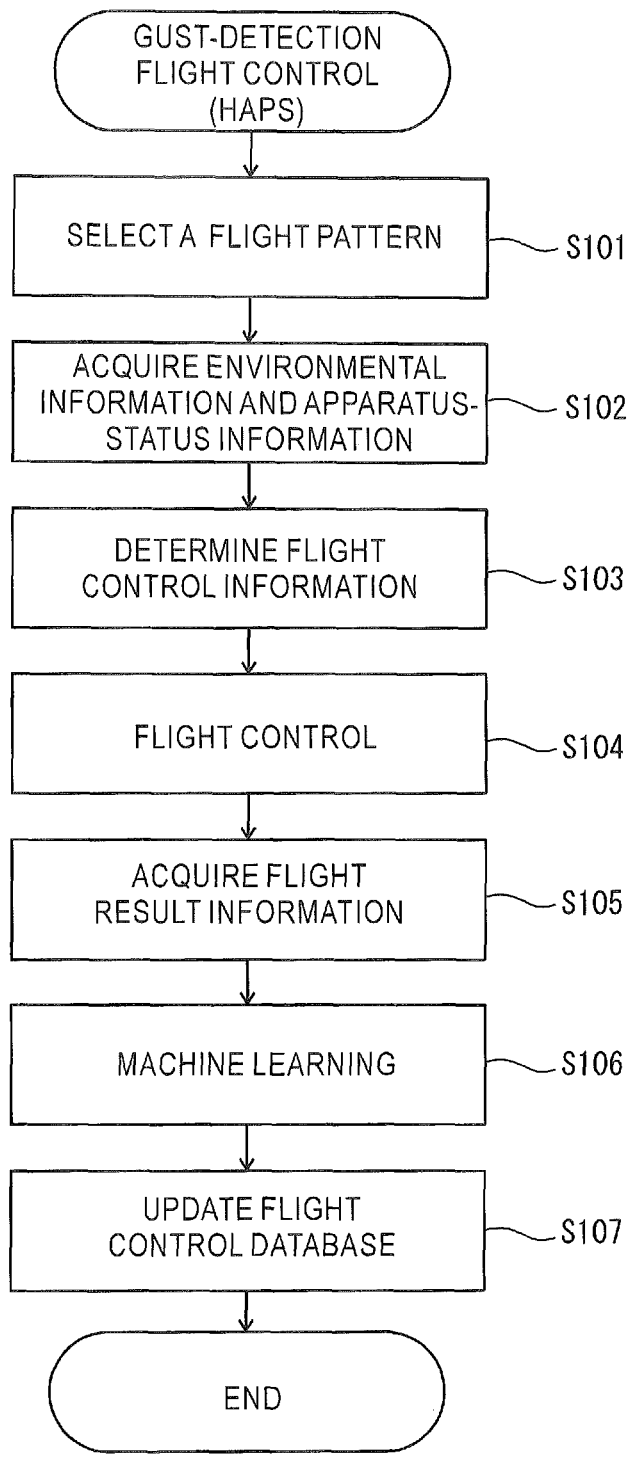
FIG. 11 is a flowchart showing an example of a flight control of a HAPS according to the embodiment.

FIG. 11 is a flowchart showing an example of a flight control of the HAPS 10 according to the embodiment. The example in FIG. 11 is an example of a flight control of an autonomous control type corresponding to the flight control system in FIG. 10.

In FIG. 11, the HAPS 10 selects one flight pattern from the above-mentioned plurality of types of flight patterns (S101), and acquires the latest information of the environmental information and the apparatus-status information including the detection result of the strong wind such as the gust generated around the HAPS 10 (S102). Next, the HAPS 10 refers to the flight control database based on the acquired environmental information and apparatus-status information for the selected flight pattern, and determines flight control information (for example, a value of control parameter for the rotational drive of each of the plurality of propellers 103) that can reduce the influence of the detected strong wind such as the gusts (S103), and performs a flight control based on the determined flight control information (S104). Next, the HAPS 10 acquires flight result information (for example, a position and attitude of the HAPS 10, a surrounding wind velocity and the like) during or after the flight control (S105), performs the above-mentioned machine learning based on the acquired flight result information (S106), and updates the flight control database so that the influence of the strong wind such as the gust can be minimized for each of the position and type of the strong wind such as the gust and the flight pattern (S107).

Figure 12:
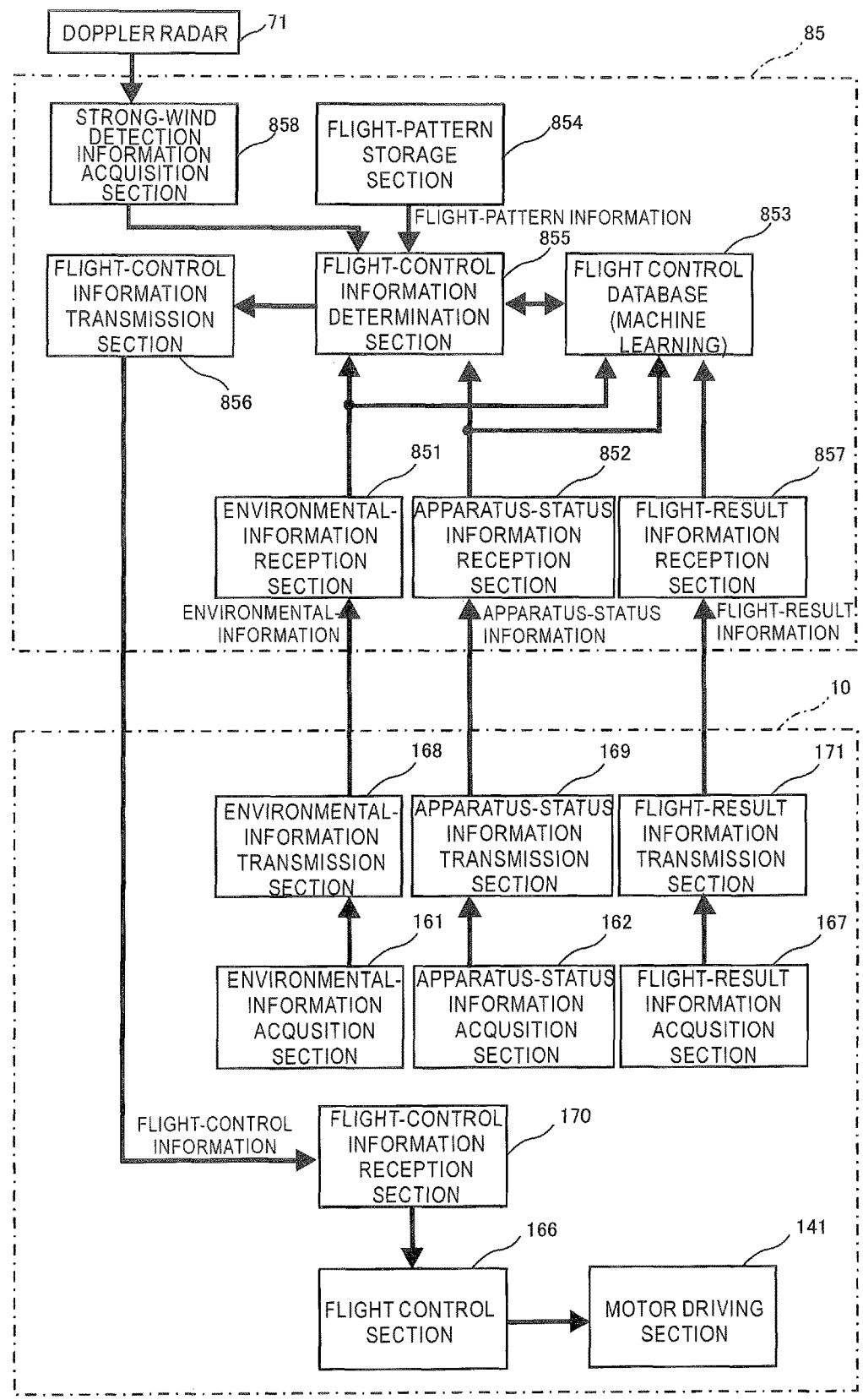
FIG. 12 is a functional block diagram showing a configuration example of a flight control system of a HAPS and a remote control apparatus according to the embodiment.

FIG. 12 is a functional block diagram showing a configuration example of a flight control system of the HAPS 10 and the remote control apparatus 85 according to the embodiment. The flight control system in FIG. 12 is an example of a remote-control type flight control system, in which the remote control apparatus 85 transmits flight control information determined based on a strong-wind detection result, an environmental information and an apparatus-status information to the HAPS 10 and allows the HAPS 10 to perform a flight control. It is noted that, in FIG. 12, configuration elements similar to those in FIG. 10 are denoted by the same reference numerals and explanations thereof are omitted.

The flight control section 166 in the HAPS 10 of FIG. 12 may be configured by the edge computing section 120 described above (see FIG. 8).

In FIG. 12, the flight control system of the HAPS 10 is further provided with an environmental-information transmission section 168, an apparatus-status information transmission section 169, a flight-control information reception section 170 and a flight-result information transmission section 171. Each of the environmental-information transmission section 168, the apparatus-status information transmission section 169 and the flight-result information transmission section 171 transmits the environmental information, the apparatus status information and the flight result information acquired by the environmental-information acquisition section 161, the apparatus-status information acquisition section 162 and the flight-result information acquisition section 167, to the remote control apparatus 85. The flight-control information reception section 170 receives the flight control information determined and transmitted by the remote control apparatus 85.

In FIG. 12, the flight control system of the remote control apparatus 85 is provided with an environmental-information reception section 851, an apparatus-status information reception section 852, a flight control database 853, a flight-pattern storage section 854, a flight-control information determination section 855, a flight-control information transmission section 856, a flight-result information reception section 857 and a strong-wind detection information acquisition section 858. The flight control database 853, the flight-pattern storage section 854 and the flight-control information determination section 855 in the figure have the same functions as the flight control database 163, the flight-pattern storage section 164 and the flight-control information determination section 165 in HAPS 10 in FIG. 10. Each of the environmental-information reception section 851, the apparatus-status information reception section 852 and the flight-result information reception section 857 receives the environmental information, the apparatus-status information and the flight-result information, which are acquired and transmitted by the HAPS 10. The flight-control information transmission section 856 transmits the flight control information determined by the flight-control information determination section 855 to the HAPS 10.

The flight-result information reception section 857 receives and acquires the strong-wind detection information on a gust or the like detected by the Doppler radar 71 installed in the feeder station 70. The environmental-information reception section 851 receives and acquires environmental information other than the strong-wind detection information from the HAPS 10.

Figure 13:
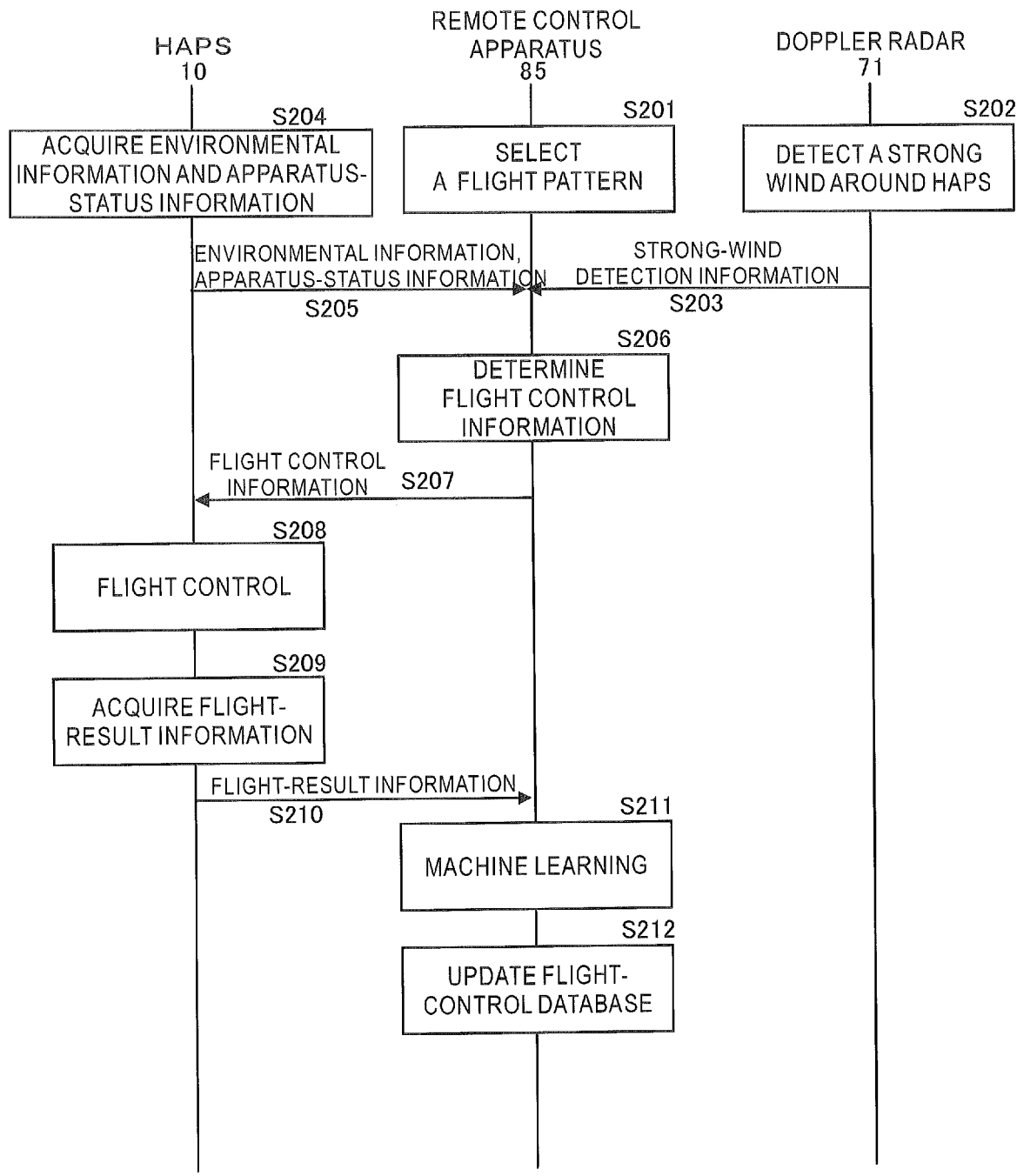
FIG. 13 is a sequence diagram showing another example of a flight control of a HAPS according to the embodiment.

FIG. 13 is a sequence diagram showing another example of a flight control of the HAPS according to the embodiment. The example in FIG. 13 is an example of a remote-control type flight control corresponding to the flight control system in FIG. 12.

In FIG. 13, the remote control apparatus 85 selects one flight pattern from a plurality of types of flight patterns used in the above-mentioned HAPS 10 (S201). The Doppler radar 71 installed in the feeder station 70 detects a strong wind such as a gust generated around the HAPS 10 (S202), and transmits the strong-wind detection information to the remote control apparatus 85 (S203). The HAPS 10 acquires the latest information of the environmental information other than the strong-wind detection information and the apparatus status information (S204), and transmits the information to the remote control apparatus 85 (S205).

Next, the remote control apparatus 85 refers to the flight control database for the selected flight pattern based on the strong-wind detection information received from the Doppler radar 71 and the environmental information and the apparatus-status information received from the HAPS 10, determines the flight control information (for example, a value of control parameter for the rotational drive of each of the plurality of propellers 103) capable of reducing an influence of the detected strong wind (S206), and transmits the determined flight control information to the HAPS 10 (S207).

The HAPS 10 performs a flight control based on the flight control information received from the remote control apparatus 85 (S208). Next, the HAPS 10 acquires the flight result information (for example, a position and attitude of the HAPS 10, a surrounding wind velocity and the like) during or after the flight control (S209), and transmits the acquired flight result information to the remote control apparatus 85 (S210). The remote control apparatus 85 performs the above-mentioned machine learning based on the flight result information received from the HAPS 10 (S211), and updates the flight control database for each of the position and type of the strong wind such as the gust and the flight pattern so that the influence of the strong wind such as the gust can be minimized (S212).

As described above, according to the present embodiments, by detecting the strong wind such as the gust generated around the HAPS 10, determining the flight control information so as to reduce the influence based on the detection result and controlling the flight of the HAPS 10 based on the flight control information, it is possible to prevent the HAPS 10 from falling.

It is noted that, in the foregoing embodiments, although the strong wind such as the gust generated around the HAPS 10 is detected by the Doppler radar, the flight of the HAPS 10 may be controlled so as to reduce the influence of the strong wind by predicting an occurrence of the strong wind such as the gust around the HAPS 10 based on the information stored in the flight control database and the environmental information and apparatus-status information at a current time in the HAPS 10.

It is noted that, the process steps and configuration elements of the relay communication station of the communication relay apparatus such as the HAPSs 10 and 20, the feeder station, the remote control apparatus, the terminal apparatus (user apparatus, mobile station, communication terminal) and the base station apparatus in the base station described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay communication station, feeder station, base station apparatus, relay-communication station apparatus, terminal apparatus (user apparatus, mobile station, communication terminal), remote control apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 HAPS (solar plane type)
20 HAPS (airship type)
40 cell-formation target airspace
41, 42, 43 three-dimensional cell
50 airspace in which HAPS is located
60 drone
65 airplane
70 feeder station
71 Doppler radar
72 artificial satellite
80 mobile communication network
85 remote control apparatus (control center)
100, 200, 300 beam
101 main wing section
102 solar panel (solar power generation panel)
103, 202 propeller
104 connection section
105 pod
106 battery
107 wheel
108 pod for receiving power
110, 210 relay communication station
111 three-dimensional (3D) cell-formation antenna section
112 transmission/reception section
113 feeder antenna section
114 transmission/reception section
115 repeater section
116 monitoring control section
117 power source section
118 modem section
119 base-station processing section
120 edge computing section
125 optical communication section
126 beam control section
130, 230 optical antenna apparatus
135, 235 Doppler radar
141 motor driving section
161 environmental-information acquisition section
162 apparatus-status information acquisition section
163 flight control database
164 flight-pattern storage section
165 flight-control information determination section
166 flight control section
167 flight-result information acquisition section
168 environmental-information transmission section
169 apparatus-status information transmission section
170 flight-control information reception section
171 flight-result information transmission section
851 environmental-information reception section
852 apparatus-status information reception section
853 flight control database
854 flight-pattern storage section
855 flight-control information determination section
856 flight-control information transmission section
857 flight-result information reception section
858 strong-wind detection information acquisition section

The invention claimed is:

1. A communication relay apparatus capable of flying in an upper airspace, comprising a relay communication station for performing a radio communication with a terminal apparatus,
wherein the communication relay apparatus comprises:
a flight control database that includes relationship data indicating a relationship between environmental information including a detection result of a gust generated around the communication relay apparatus, flight control information determined based on the detection result of the gust generated around the communication relay apparatus, and apparatus-status information indicating a status of the communication relay apparatus, wherein the apparatus-status information includes at least one of current position, velocity relative to the air, velocity relative to the ground, and propulsion direction;
an environmental-information acquisition section that acquires the environmental information including the detection result of the gust and the apparatus-status information at a current time with respect to the communication relay apparatus;
a flight-control information determination section that determines flight control information so as to reduce an influence of the gust by predicting an occurrence of the gust around the communication relay apparatus based on the relationship data stored in the flight control database, and the environmental information including the detection result of the gust and the apparatus-status information at the current time acquired with respect to the communication relay apparatus; and
a flight control section that controls a flight of the communication relay apparatus based on the determined flight control information.

2. The communication relay apparatus according to claim 1,
wherein the flight control information includes at least one of a flight direction, velocity, altitude, attitude, flight route and flight pattern of the communication relay apparatus.

3. The communication relay apparatus according to claim 1, further comprising:
a Doppler radar that detects an occurrence of a gust generated around the communication relay apparatus by observing a direction and velocity of a wind around the communication relay apparatus; and a flight-control information determination section that determines flight control information of the communication relay apparatus so as to reduce an influence of the gust detected by the Doppler radar.

4. The communication relay apparatus according to claim 3, wherein a detection target airspace for detecting the gust with the Doppler radar is narrowed down based on information on a current position and a flight route of the communication relay apparatus.

5. The communication relay apparatus according to claim 3, wherein a detection target airspace for detecting the gust with the Doppler radar is narrowed down based on at least one of a statistical value of a past upper-air weather observation data, a latest upper-air weather observation data and a weather measurement data measured by a measurement apparatus provided in the communication relay apparatus.

6. The communication relay apparatus according to claim 1, wherein the environmental-information acquisition section receives information on the gust generated around the communication relay apparatus detected by a Doppler radar disposed outside the communication relay apparatus; and wherein the flight-control information determination section determines flight control information of the communication relay apparatus so as to reduce an influence of the gust generated around the communication relay apparatus based on the information on the gust received from the Doppler radar.

7. The communication relay apparatus according to claim 6, wherein the Doppler radar is disposed in a feeder station on the ground or on the sea, the feeder station relaying a communication between the communication relay apparatus and a mobile communication network.

8. The communication relay apparatus according to claim 6, wherein a detection target airspace for detecting the gust with the Doppler radar is narrowed down based on information on a current position and a flight route of the communication relay apparatus.

9. The communication relay apparatus according to claim 6, wherein a detection target airspace for detecting the gust with the Doppler radar is narrowed down based on at least one of a statistical value of a past upper-air weather observation data, a latest upper-air weather observation data and a weather measurement data measured by a measurement apparatus provided in the communication relay apparatus.

10. The communication relay apparatus according to claim 1, further comprising:

a flight-control information reception section that receives flight control information of the communication relay apparatus, the flight control information being determined so as to reduce an influence of a gust generated around the communication relay apparatus and detected by a Doppler radar disposed outside the communication relay apparatus.

11. The communication relay apparatus according to claim 10, wherein the Doppler radar is disposed in a feeder station on the ground or on the sea, the feeder station relaying a communication between the communication relay apparatus and a mobile communication network.

12. The communication relay apparatus according to claim 10, wherein a detection target airspace for detecting the gust with the Doppler radar is narrowed down based on information on a current position and a flight route of the communication relay apparatus.

13. The communication relay apparatus according to claim 10, wherein a detection target airspace for detecting the gust with the Doppler radar is narrowed down based on at least one of a statistical value of a past upper-air weather observation data, a latest upper-air weather observation data and a weather measurement data measured by a measurement apparatus provided in the communication relay apparatus.

14. The communication relay apparatus according to claim 1, wherein the communication relay apparatus forms a three-dimensional cell in a predetermined cell-formation target airspace between the ground or the sea surface, and wherein an altitude of the cell-formation target airspace is 10 [km] or less.

15. The communication relay apparatus according to claim 1, wherein the communication relay apparatus is located at an altitude of 100 [km] or less.

16. The communication relay apparatus according to claim 1, wherein the flight control database updates the relationship data by performing a machine learning based on the flight control information, the environmental information, the apparatus-status information and an actual flight-control result information.

17. The communication relay apparatus according to claim 1, wherein the communication relay apparatus performs a flight control so as to move while gliding and generating electricity by a rotation of a propeller, when being swept away by an airflow of the gust.

18. A system comprising:

a communication relay apparatus capable of flying in an upper airspace, the communication relay apparatus comprising a relay communication station for performing a radio communication with a terminal apparatus;

a Doppler radar disposed on the ground or on the sea to detect a gust generated around the communication relay apparatus by observing a direction and velocity of a wind around the communication relay apparatus; and a management apparatus that remotely controls the communication relay apparatus, wherein the management apparatus comprises:

a flight control database that includes a relationship data indicating a relationship between environmental information including a detection result of a gust generated around the communication relay apparatus and detected by the Doppler radar, flight control information determined based on the detection result of the gust generated around the communication relay apparatus and detected by the Doppler radar, and apparatus-status information indicating a status of the communication relay apparatus, wherein the apparatus-status information includes at least one of current position, velocity relative to the air, velocity relative to the ground, and propulsion direction;

a strong-wind detection information acquisition section that acquires current information on the gust generated around the communication relay apparatus and detected by the Doppler radar;

an apparatus-status information reception section that acquires information on a current position of the communication relay apparatus;

a flight-control information determination section that determines flight control information of the communication relay apparatus so as to reduce an influence of the predicted gust, by predicting an occurrence of the gust generated around the communication relay apparatus, based on the relationship data stored in the flight control database, the current information on the gust generated around the communication relay apparatus and detected by the Doppler radar, and the current position of the communication relay apparatus; and a flight-control information transmission section that transmits the flight control information to the communication relay apparatus.

19. A management apparatus located on the ground, on the sea or in an upper airspace, the management apparatus managing the communication relay apparatus capable of flying in an upper airspace, the communication relay apparatus comprising a relay communication station for performing a radio communication with a terminal apparatus, wherein the management apparatus comprises, a flight control database that includes a relationship data indicating a relationship between environmental information including a detection result of a gust generated around the communication relay apparatus and detected by a Doppler radar, flight control information determined based on the detection result of the gust generated around the communication relay apparatus and detected by the Doppler radar, and apparatus-status information indicating a status of the communication relay apparatus, wherein the apparatus-status information includes at least one of current position, velocity relative to the air, velocity to the ground, and propulsion direction;

a strong-wind detection information acquisition section that acquires current information on the gust generated around the communication relay apparatus and detected by the Doppler radar;

an apparatus-status information reception section that acquires information on a current position of the communication relay apparatus;

a flight-control information determination section that determines flight control information of the communication relay apparatus so as to reduce an influence of the predicted gust, by predicting an occurrence of a gust generated around the communication relay apparatus, based on the relationship data stored in the flight control database, the current information on the gust generated around the communication relay apparatus and detected by the Doppler radar, and the current position of the communication relay apparatus; and a flight-control information transmission section that transmits the flight control information to the communication relay apparatus.

20. A method for controlling a flight of a communication relay apparatus capable of flying in an upper airspace by the own communication relay apparatus, the communication relay apparatus comprising a relay communication station for performing a radio communication with a terminal apparatus, the method comprising:

storing a relationship data indicating a relationship between environmental information including a detection result of a gust generated around the communication relay apparatus, flight control information determined based on the detection result of the gust generated around the communication relay apparatus, and apparatus-status information indicating a status of the communication relay apparatus, wherein the apparatus-status information includes at least one of current position, velocity relative to the air, velocity relative to the ground, and propulsion direction;

acquiring the environmental information including the detection result of the gust and the apparatus-status information at a current time with respect to the communication relay apparatus; determining flight control information so as to reduce an influence of the gust by predicting an occurrence of a gust around the communication relay apparatus based on the relationship data stored in the flight control database, and the environmental information including the detection result of the gust and the apparatus-status information at the current time acquired with respect to the communication relay apparatus; and controlling a flight of the communication relay apparatus based on the flight control information.

21. A method for controlling a flight of a communication relay apparatus capable of flying in an upper airspace by a management apparatus located on the ground, on the sea or in an upper airspace, the communication relay apparatus comprising a relay communication station for performing a radio communication with a terminal apparatus, the method comprising:

storing a relationship data indicating a relationship between environmental information including a detection result of a gust generated around the communication relay apparatus and detected by a Doppler radar, flight control information determined based on the detection result of the gust generated around the communication relay apparatus and detected by the Doppler radar, and apparatus-status information indicating a status of the communication relay apparatus, wherein the apparatus-status information includes at least one of current position, velocity relative to the air, velocity relative to the ground, and propulsion direction;

acquiring current information on the gust generated around the communication relay apparatus and detected by the Doppler radar, and a current position of the communication relay apparatus; determining flight control information of the communication relay apparatus so as to reduce an influence of the predicted gust by predicting an occurrence of a gust generated around the communication relay apparatus, based on the relationship data stored in the flight control database, the current information on the gust generated around the communication relay apparatus and detected by the Doppler radar, and the current position of the communication relay apparatus; and transmitting the flight control information to the communication relay apparatus.

* * * * *